United States Patent [19]
Schaefer

[11] Patent Number: 4,816,664
[45] Date of Patent: Mar. 28, 1989

[54] FOCUSING DETECTOR HAVING A SCANNING GRATING USED BOTH AS A BEAM SPLITTER AND SPATIAL AND FREQUENCY FILTER

[75] Inventor: Klaus-Dieter Schaefer, Braunfels, Fed. Rep. of Germany

[73] Assignee: Ernst Leitz Wetzlar GmbH, Fed. Rep. of Germany

[21] Appl. No.: 921,487

[22] Filed: Oct. 22, 1986

[30] Foreign Application Priority Data

Oct. 24, 1985 [DE] Fed. Rep. of Germany ....... 3537782

[51] Int. Cl.[4] .................................................. G01J 1/20
[52] U.S. Cl. ...................................... 250/201; 354/407
[58] Field of Search .......................... 250/201 PF, 204; 354/406, 407, 408; 350/172, 162.12

[56] References Cited

U.S. PATENT DOCUMENTS

| | | | |
|---|---|---|---|
| 3,668,406 | 6/1972 | Reid et al. | 350/172 |
| 3,781,110 | 12/1973 | Leitz et al. | 356/4 |
| 3,970,842 | 7/1976 | Nanba et al. | 250/201 |
| 3,989,378 | 11/1976 | Heitmann et al. | 356/28 |
| 4,037,958 | 7/1977 | Schmidt et al. | 250/201 |
| 4,048,492 | 9/1977 | Hartmann | 250/201 |
| 4,117,325 | 9/1978 | Holle et al. | 250/204 |
| 4,339,176 | 7/1982 | Lee | 350/162.12 |
| 4,591,256 | 5/1986 | Matsumura | 354/406 |

FOREIGN PATENT DOCUMENTS

| | | | |
|---|---|---|---|
| 0479755 | 7/1929 | Fed. Rep. of Germany | 350/172 |
| 2156617 | 5/1973 | Fed. Rep. of Germany . | |
| 2160877 | 6/1973 | Fed. Rep. of Germany . | |
| 1158591 | 6/1958 | France | 350/172 |

*Primary Examiner*—David C. Nelms
*Assistant Examiner*—William L. Oen
*Attorney, Agent, or Firm*—Foley & Lardner, Schwartz, Jeffery, Schwaab, Mack, Blumenthal & Evans

[57] ABSTRACT

A scanning grating for a focusing detector and a focusing detector are described. The scanning grating serves as an image scanner and spatial frequency filter and includes at least two surface elements splitting up an incident luminous flux into two spatially separate light fluxes and by means of which, in conjunction with a field lens, two images of the exit pupil, or parts thereof, of an associated optical system are generated in a plane in which at least two photo-receiver systems are mounted. Means acting optically as complementary plane-parallel plates are provided to split up the luminous flux from the optical system into two spatially separate light fluxes.

18 Claims, 1 Drawing Sheet

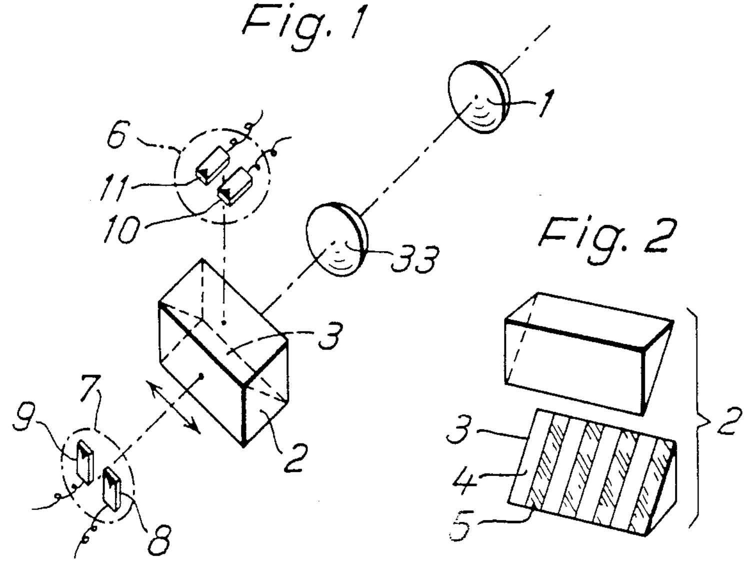
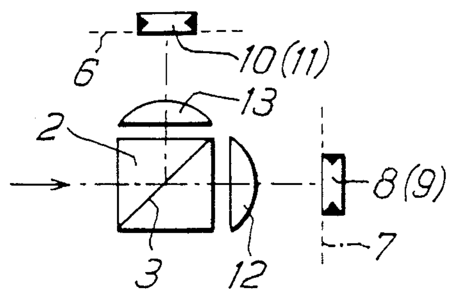
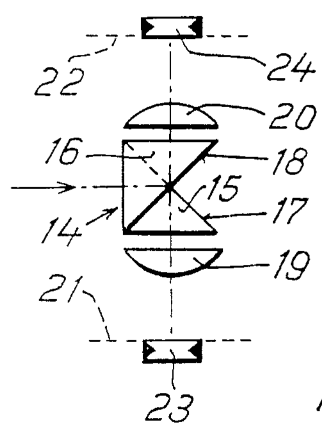
Fig.3
6
10(11)
13
2
8(9)
3
12
7
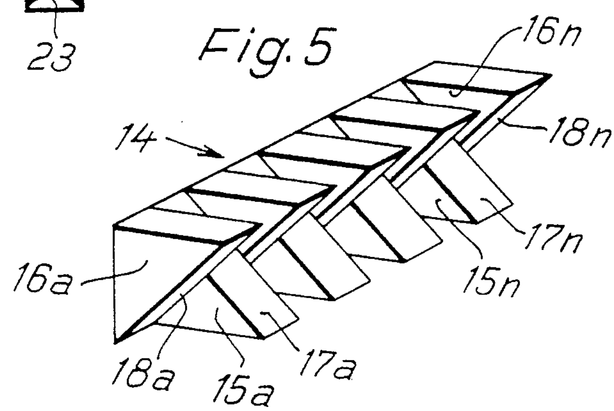

FOCUSING DETECTOR HAVING A SCANNING GRATING USED BOTH AS A BEAM SPLITTER AND SPATIAL AND FREQUENCY FILTER

BACKGROUND OF THE INVENTION

The present invention relates to a scanning grating for use in a focusing detector and to a focusing detector. The scanning grating serves as an image scanner and spatial frequency filter, and includes at least two surface elements splitting up a luminous flux into two spatially separate light fluxes and by means of which, in conjunction with a field lens, two images or parts thereof are generated in a plane in which at least two photo-receiver systems are situated.

These scanning gratings are used for the scanning of an object in the determination of the sharp focusing of an optical system.

In this regard, there is known from German Offenlegungsschrift No. 2,156,617 a "focusing detector", which is constructed as a furrow raster, which in addition to its function as a spatial frequency filter also splits up the luminous flux coming from the optical system and directs it in two different directions.

A disadvantage of this "focusing detector" is, however, the poor utilization of the light incident on it and the resulting weak signals therefrom, which can be further processed only with the application of a high degree of technical effort.

In order to be able to utilize the radiation not used in the above-mentioned "focusing detector", there has been proposed in German Offenlegungsschrift No. 2,160,877 to use a pyramid raster as a scanning grating, with which the radiation incident on it is directed to four photo-receivers. The disadvantage of using such a grating residues in the fact that the photo-receivers must be mounted so as to be associated accurately and unambiguously with the individual pupil regions. This involves large splitting-up angles, so that the partial pupils—resulting from the splitting-up at the pyramid surfaces—of the optical system are laterally separated to a sufficient extent.

In the case of large, and above all, variable pupil images, such as are inevitably generated in the case of interchangeable lenses of miniature cameras, large splitting-up angles involve problems. Besides optical defects, geometric distortions in the pupil images also arise in account of the oblique path of the incident beams. These distortions give rise to falsified signals.

SUMMARY OF THE INVENTION

An object of the present invention is accordingly to provide a scanning grating and a focusing detector, with which a sufficiently large lateral splitting-up of luminous flux coming from the optical system into at least two spatial light fluxes can be achieved without the pupil images arising therefrom being subjected to image deterioriation.

A further object of the present invention is to provide a focusing detector in which the photo-receivers are not required to be mounted with a high degree of accuracy.

An additional object of the present invention is to provide a focusing detector which can be constructed to provide accurate operation, but does not take up excessive amounts of space.

In accomplishing the foregoing objects, there has been provided according to one aspect of the present invention a scanning grating for a focusing detector, which serves as an image scanner and as a spatial frequency filter, comprising means acting optically as complementary plane-parallel plates for splitting up an incident luminous flux into two spatially separate light fluxes; and means using the separate fluxes, for generating images in two different planes. In one preferred embodiment, the means acting optically as complementary plane-parallel plates comprises a divider cube having a divider surface, wherein a reflecting strip grating comprised of alternately light-transmitting and mirror-coated strips is applied to the divider surface of the divider cube. In another preferred embodiment, the means acting optically as complementary plane-parallel plates comprises individual prism segments, which are indented into one another and which exhibit differently oriented reflecting surfaces.

In accordance with another aspect of the invention, there has been provided a focusing detector for determining sharp focusing of an object by an optical system which includes an exit pupil, comprising a scanning grating serving as an image scanner and a spatial frequency filter and including means, acting optically as complementary plane parallel plates, for splitting up an incident luminous flux from the optical system into two spatially separate light fluxes; a field lens system cooperating with the scanning grating for generating with the separate light fluxes at least partial images of the exit pupil in two image planes; and a plurality of photo-receiver systems located in each of the image planes.

Further objects, features and advantages of the pesent invention will become apparent from the detailed description of preferred embodiments which follows, when considered together with the attached figures of drawing.

BRIEF DESCRIPTION OF THE DRAWINGS

In the drawings:

FIG. 1 is a schematic view illustrating a focusing detector with the scanning grating according to the invention in perspective;

FIG. 2 shows a scanning grating in the form of a reflecting strip grating, in detail;

FIG. 3 shows a further exemplary embodiment for the construction of a focusing detector;

FIG. 4 shows the novel scanning grating in the form of a prism segment grating; and FIG. 5 is a schematic, perspective view illustrating the prism segment grating according to FIG. 4, in detail.

DETAILED DESCRIPTION OF THE PREFERRED EMBODIMENTS

For a scanning grating of the initially mentioned kind, the present invention provides that means acting optically as complementary plane-parallel plates are provided to split up the luminous flux into the two spatially separate light fluxes.

The novel focusing detector is provided, according to FIG. 1, for an optical imaging system 1, which is sharply focused on an object (not shown) according to the method described in German Offenlegungsschriften No. 2,156,617 and No. 2,160,877. However, in place of the furrows or pyramid rasters described therein, according to the present invention a divider grating 2 is employed, which is disposed in the image plane of the imaging system 1 or a plane conjugate thereto and which splits up the luminous flux leaving the imaging system 1 into two partial light fluxes. Moreover, on its surface 3 which splits up the light, the divider grating 2 is subdivided alternately into light-transmitting and reflecting strips 4 and 5 respectively, as shown in FIG. 2. Furthermore, the divider grating 2 oscillates perpendicularly to the optical axis of the focusing detector in the direction of the arrow shown in FIG. 1.

Between the imaging system 1 and the divider grating 2 there is disposed a field lens 33, which, in conjunction with the splitting-up property of the divider grating 2, generates in different planes 6 and 7 respective images of the exit pupil of the imaging system 1.

Photo-receiver systems 8, 9 and 10, 11 respectively are disposed in the planes 6 and 7. They are associated with defined regions of the pupil images and convert the light fluxes which leave these regions and which are modulated by the movement of the divider grating 2 into electrical signals, which are then further processed as described in German Offenlegungsschriften No. 2,156,617 and No. 2,160,877.

The exemplary embodiment which is represented in FIG. 3 and in which components corresponding to FIG. 1 bear the same reference symbols, is distinguished from the above-described focusing detector in that the luminous flux leaving the imaging system 1 is passed directly to the divider grating 2. The imaging of the pupil of the imaging system 1 in the separate planes 6 and 7 respectively (here shown in broken lines) takes place by means of optical systems which are positioned behind the divider surface 3 and which are represented as individual lenses 12 and 13.

The conversion of the two modulated partial light fluxes into electrical signals and further processing thereof takes place as described with reference to FIG. 1.

A further exemplary embodiment of a focusing detector is shown in FIG. 4, in which a prism segment grating 14 takes the place of the divider grating 2 from FIGS. 1 to 3. The prism segment grating consists, as is shown in detail in FIG. 5, of prism segments **15*a*–15*n* and 16–16*n*, which are indented into one another. The prism segments 15*a*–15*n* and 16*a*–16*n* exhibit differently oriented reflecting surfaces 17*a*–17*n* and 18*a*–18*n*. These are combined in such a manner that they derive from the luminous flux incident from the imaging system 1 two partial light fluxes which are mutually offset by 180°. By means of lenses 19 and 20, an image of the exit pupil of the imaging system 1 is formed from the partial light fluxes in planes 21 and 22, in which double photo-receiver systems 23 and 24 are disposed and form from the light fluxes incident on them electrical signals, the further processing of which takes place as described above with reference to FIG. 1**.

It is within the scope of the present invention to select the angles of inclination of the divider surface 3 or reflecting surfaces **17*a*–17*n* and 18*a*–18*n*** to be different from 45°. It must simply be ensured that the exit surfaces are also disposed so that, overall, the character of a plane-parallel plate is maintained, so that the image of the exit pupil stands perpendicular to the light fluxes exiting from the exit surface of the divider grating and thus the defects occurring in the case of a wedge prism are eliminated.

What is claimed is:

1. A scanning grating for a focusing detector, said scanning grating being positioned transversely of an optical axis of the focussing detector and serving as an image scanner and as a spatial frequency filter, said scanning grating comprising:

(a) optical means, comprising a plurality of plane-parallel regions lying adjacent to one another transversely with respect to the optical axis and acting optically as complementary plane-parallel plates, for splitting up a luminous flux incident along the optical axis into two spatially separate light fluxes; and (b) means using said separate fluxes, for generating images in two different planes.

2. A scanning grating as in claim 1, wherein the optical means comprises a divider cube having a divider surface, wherein a reflecting strip grating comprised of alternately light-transmitting and mirror-coated strips is applied to the divider surface of the divider cube.

3. A scanning grating as in claim 1, wherein the optical means comprises a plurality of plane-parallel individual prism segments, which are positioned adjacent to one another and alternate ones of which comprise similarly oriented reflecting surfaces whereas adjacent ones of which comprise differently oriented reflecting surfaces.

4. A scanning grating as in claim 3, in which the prism segments are alternately combined in such a manner that two light fluxes which are mutually offset by 180° are created by the reflecting surfaces from the incident luminous flux.

5. A scanning grating as in claim 1, wherein the means for splitting up the luminous flux is comprised of at least two surface elements.

6. A focusing detector for determining sharp focusing on an object by an optical system which includes an optical axis and an exit pupil, said focusing detector comprising:

(a) a scanning grating serving as an image scanner and a spatial frequency filter and including optical means, comprising a plurality of plane-parallel regions lying adjacent to one another transversely with respect to the optical axis and acting optically as complementary plane-parallel plates, for splitting up a luminous flux incident along the optical axis into two spatially separate light fluxes;

(b) a field lens system cooperating with said scanning grating for generating with said separate light fluxes at least partial images of the exit pupil in two image planes; and (c) a plurality of photo-receiver systems located in each of said image planes.

7. A focusing detector as in claim 6, wherein the optical means comprises a divider cube having a divider surface, wherein a reflecting strip grating comprised of alternately light-transmitting and mirror-coated strips is applied to the divider surface of the divider cube.

8. A focusing detector as in claim 6, wherein the optical means comprises a plurality of plane-parallel individual prism segments, which are positioned adjacent to one another and alternate ones of which comprise similarly oriented reflecting surfaces whereas adjacent ones of which comprise differently oriented reflecting surfaces.

9. A focusing detector as in claim 6, in which the prism segments are alternately combined in such a manner that two light fluxes which are mutually offset by 180° are created by the reflecting surfaces from the incident luminous flux.

10. A focusing detector as in claim 6, wherein the means for splitting up the luminous flux is comprised of at least two surface elements.

11. A focusing detector as in claim 8, wherein the optical means comprises a planar surface on a toothed configuration on a side opposite the planar surface, said toothed configuration being comprised of said alternating reflecting surfaces

12. A focusing detector as in claim 6, wherein the number and spacing of said plane-parallel regions is sufficient to form said scanning grating.

13. A focusing detector as in claim 6, further comprising means for moving said optical means transversely with respect to the optical axis.

14. A focusing detector as in claim 6, wherein said optical means is located in an image plane of said optical system.

15. A focusing detector as in claim 6, wherein said at least partial image of the exit pupil is perpendicular to its respective spatially separate light flux exiting from said optical means.

16. A scanning grating as in claim 1, wherein each of said images is perpendicular to its respective spatially separate light flux exiting from said optical means.

17. A focusing detector for determining sharp focusing on an object by an optical system which includes an optical axis and an exit pupil, said focusing detector comprising:

(a) optical means, comprising a plurality of plane-parallel regions lying adjacent to one another transversely with respect to the optical axis and acting optically as complementary plane-parallel plates, for splitting up a luminous flux incident along the optical axis into two spatially separate light fluxes;

(b) a field lens system cooperating with said optical means for generating with said separate light fluxes at least partial images of the exit pupil in two image planes; and (c) a plurality of photo-receiver systems located in each of said image planes.

18. A focusing detector for determining sharp focusing on an object by an optical system which includes an optical axis and an exit pupil, said focusing detector comprising:

(a) optical means for splitting up a luminous flux incident along the optical axis into two spatially separate light fluxes;

(b) a field lens system cooperating with said optical means for generating with said separate light fluxes at least partial images of the exit pupil in two image planes; and (c) a plurality of photo-receiver systems located in each of said image planes, wherein said optical means comprises means for producing said at least partial images so that they are oriented perpendicular to the spatially separate light fluxes exiting from the optical means.

* * * * *